(12) United States Patent
Kalinowski et al.

(10) Patent No.: US 8,568,061 B2
(45) Date of Patent: Oct. 29, 2013

(54) POLYURETHANE FOAMS FOR TRENCH BREAKER AND OTHER APPLICATIONS

(75) Inventors: Timothy T. Kalinowski, St. Charles, MO (US); David G. Keske, Glenco, MO (US); Victor B. Matimba, Corinth, TX (US); David L. Modray, Kirkwood, MO (US); Mark Schulte, Moline Acres, MO (US); Donald C. Keim, O'Fallon, MO (US)

(73) Assignee: Foam Supplies, Inc., Earth City, MO (US)

( * ) Notice: Subject to any disclaimer, the term of this patent is extended or adjusted under 35 U.S.C. 154(b) by 464 days.

(21) Appl. No.: 12/646,959

(22) Filed: Dec. 23, 2009

(65) Prior Publication Data

US 2010/0158614 A1      Jun. 24, 2010

Related U.S. Application Data

(60) Provisional application No. 61/140,734, filed on Dec. 24, 2008.

(51) Int. Cl.
*F16L 1/028*     (2006.01)

(52) U.S. Cl.
USPC ............... 405/184.4; 405/282; 521/170

(58) Field of Classification Search
USPC .......... 405/184.4, 272, 282, 302.4, 302.6;
521/155–177; 264/46.4, 46.7
See application file for complete search history.

(56) References Cited

U.S. PATENT DOCUMENTS

| | | | | |
|---|---|---|---|---|
| 3,313,321 A | * | 4/1967 | Keller | 138/105 |
| 5,900,195 A | * | 5/1999 | Pool et al. | 264/46.5 |
| 2007/0215267 A1 | * | 9/2007 | Brown | 156/158 |

* cited by examiner

*Primary Examiner* — Sean Andrish
(74) *Attorney, Agent, or Firm* — Dentons US LLP

(57) ABSTRACT

The invention is directed to methods for supporting trench pipes with polyurethane foams which are flotation resistant with sufficient strength and density to provide stability and inhibit erosion at pipeline trench sites, and other uses, wherein at least 50% of the foam is open cell and has a density of approximately 1.3 lbs/ft$^3$ to 3.5 lbs/ft$^3$. The invention also provides methods for making compositions used to make polyurethane foams that exhibit such characteristics.

7 Claims, 3 Drawing Sheets

POLYURETHANE FOAMS FOR TRENCH BREAKER AND OTHER APPLICATIONS

CROSS-REFERENCE TO RELATED APPLICATIONS

This application claims priority from U.S. Provisional Application Ser. No. 61/140,734 filed on Dec. 24, 2008, which is incorporated herein by reference in its entirety to the extent permitted by law.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention relates to polyurethane foam trench breakers for pipeline installation and support. For example, foams prepared with less susceptibility to flotation.

I. Introduction

Polyurethane foams insulate, float, cushion, glue, clothe and absorb sound, among many other applications. Polyurethanes, defined as polymeric substances having multiple urethane linkages, are a large family of polymers with widely ranging properties and uses. The types and properties of polyurethanes are so varied that the Alliance for the Polyurethanes Industry (Arlington, Va.) has dubbed them the "erector set" of the plastics industry. Types of polyurethanes include rigid and flexible foams; thermoplastic polyurethane; and other miscellaneous types, such as coatings, adhesives, sealants and elastomers. Flexible foams (e.g., that found in most car seat cushions) are generally open-celled materials, while rigid foams (e.g., building insulation) usually have a high proportion of closed cells.

One growing application for polyurethane foams is their use as trench breakers and pipe pads for pipeline installations, for example, to transport natural gas, oil, water and sewage. Trench breakers can be used to prevent erosion caused by rainfall runoff along the slope of an open trench and to minimize the potential of groundwater seeping along the pipe. Trench breakers can also be used to safeguard wetland sites that otherwise would be drained by the trench. Polyurethane foam can be used to secure pipes and inhibit erosion with substantial improvements and time savings to contractors when installing and backfilling pipes, as compared to traditional gravel or rock fill. However, existing polyurethane foams used for this purpose have been known to rise and float when heavy rains and water soak the pipe trenches, sometimes resulting in movement, settlement and cracking of pipes.

Conventionally, processes employing two components or three components have been used to prepare polyurethane foams. One component, generally referred to as component A (or A-side), comprises an isocyanate. Frequently, component A also comprises a surfactant, blowing agent and/or flame retardant. The second component, known generally as component B (or B-side), comprises any of various polyols, particularly polyether and/or polyester polyols. Component B may also comprise a surfactant, a catalyst package, a blowing agent or agents, flame retardants, antioxidants, fungicides, viscosity modifiers, acid scavengers, solid fillers and many other additives, any or all of which may reside solely in component B. Alternatively, any or all of such ingredients may be introduced to the reaction mixture in a third stream or in both component B and a third stream. The process for making foams typically involves the mixing of the starting materials with polyurethane foam production machinery and pouring the reacting mixture, as it exits the mix-head, into a mold or other designation. For use in trenches, the foam may be applied directly in the trench in the field or made into prefabricated saddles prior to installation.

SUMMARY OF THE INVENTION

Accordingly, it is an object of the invention to provide a flotation resistant foam with sufficient strength and density to provide stability and inhibit erosion at pipeline trench sites.

In a first aspect, the invention provides polyurethane foams for use in pipeline trench breaker foam applications, wherein at least 50% of the foam is open cell, the foam has a density of approximately 1.30 lbs/ft$^3$ to 3.50 lbs/ft$^3$, the foam has a minimum compressive strength of 17 psi parallel to the rise of the foam, and the foam when tested in accordance with the American Society For Testing Standard Test Method For Water Absorption Of Rigid Cellular Plastics (ASTM D2841) exhibits a buoyancy loss of at least 20% after 24 hours of testing under 10 feet of water.

In a second aspect, the invention provides a method of supporting trench pipes comprising inserting into a trench in which or to which a pipe is to be or has been placed, a composition comprising a polyurethane foam wherein at least 50% of the foam is open cell and the foam has a density of approximately 1.3 lbs/ft$^3$ to 3.5 lbs/ft$^3$, and has a minimum compressive strength of 17 psi parallel to the rise of the foam, and when tested in accordance with ASTM D2842 exhibits a buoyancy loss of at least 20% after 24 hours of testing under 10 feet of water; and backfilling the trench after the foam and the pipe have been inserted into the trench.

These and other features, aspects and advantages will become better understood with reference to the following description, examples and appended claims.

DESCRIPTION OF THE DRAWINGS

FIG. 2 is a series of drawings depicting a pipe (201) surrounded by foam (202) within a trench.

FIG. 3 is a series of drawings depicting a pipe (301) surrounded by foam (302) within a trench.

DETAILED DESCRIPTION OF THE INVENTION

Figure 1:
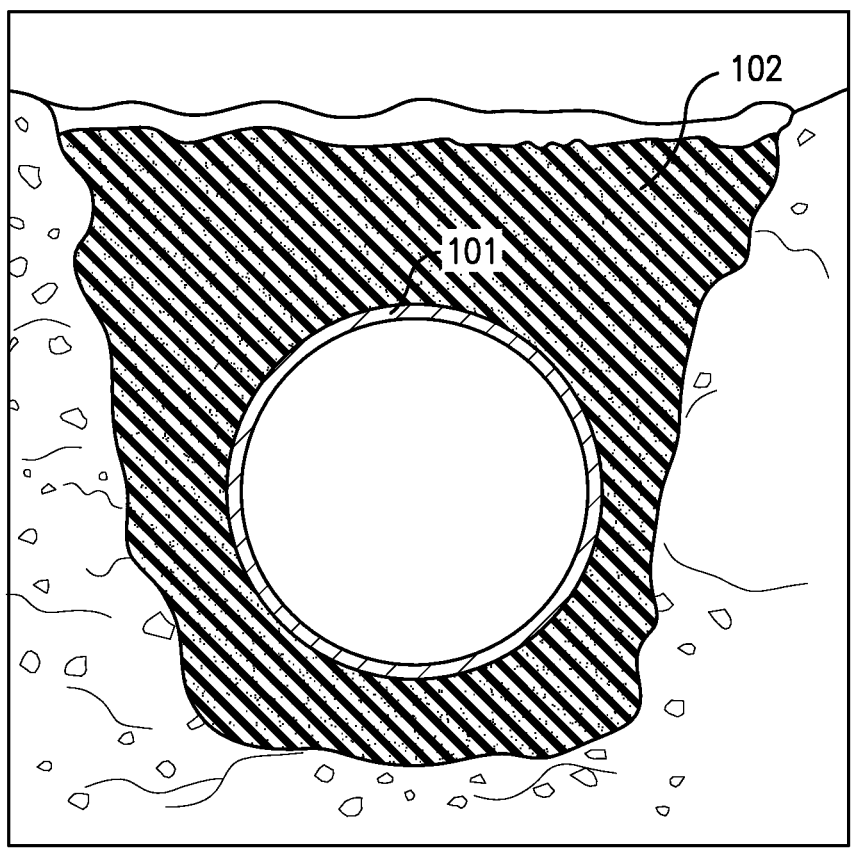
FIG. 1 is a cross-sectional view of a pipe (101) surrounded by foam (102) within a trench.
Figure 2A:
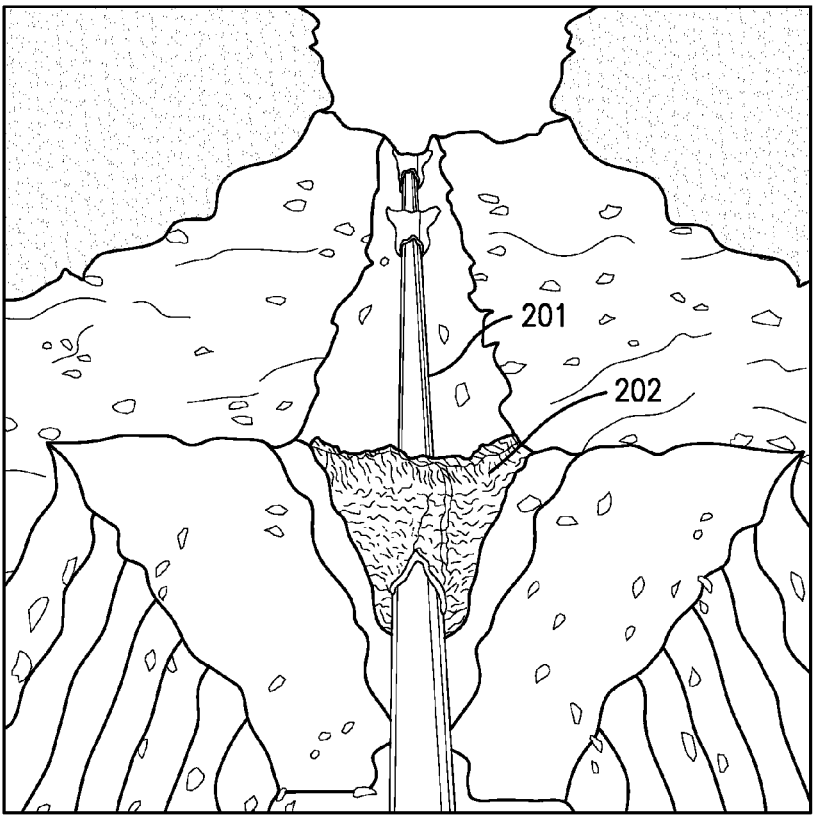
FIG. 2A is a drawing depicting a pipe (201) surrounded by foam (202) at various intervals within a trench.
Figure 2B:
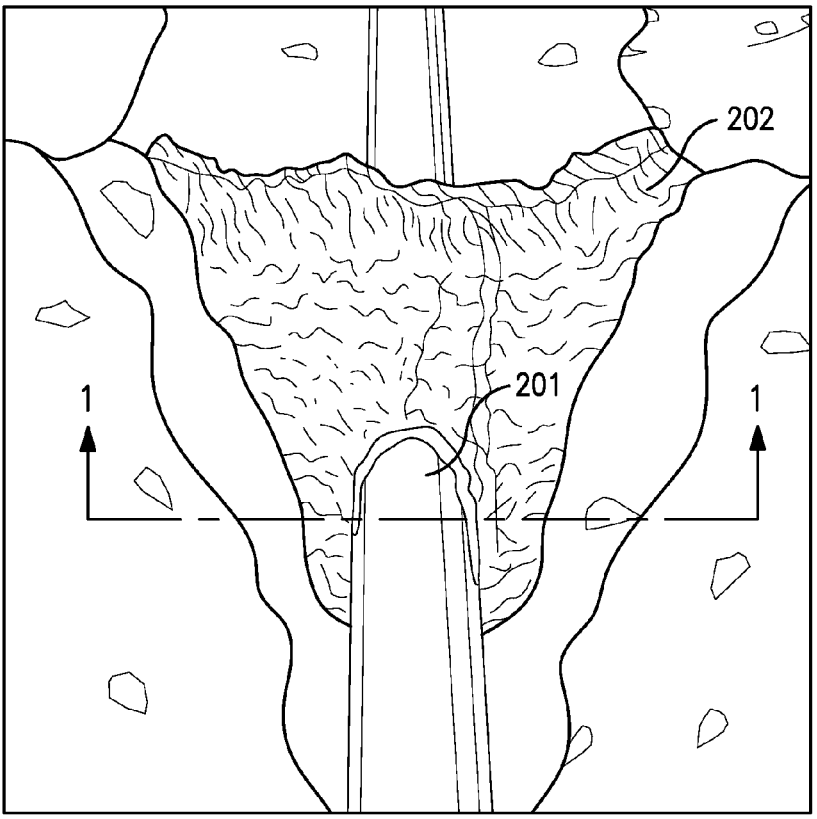
FIG. 2B is a close up of FIG. 2A drawing depicting one section of a pipe (201) surrounded by foam (202) within a trench.
Figure 3A:
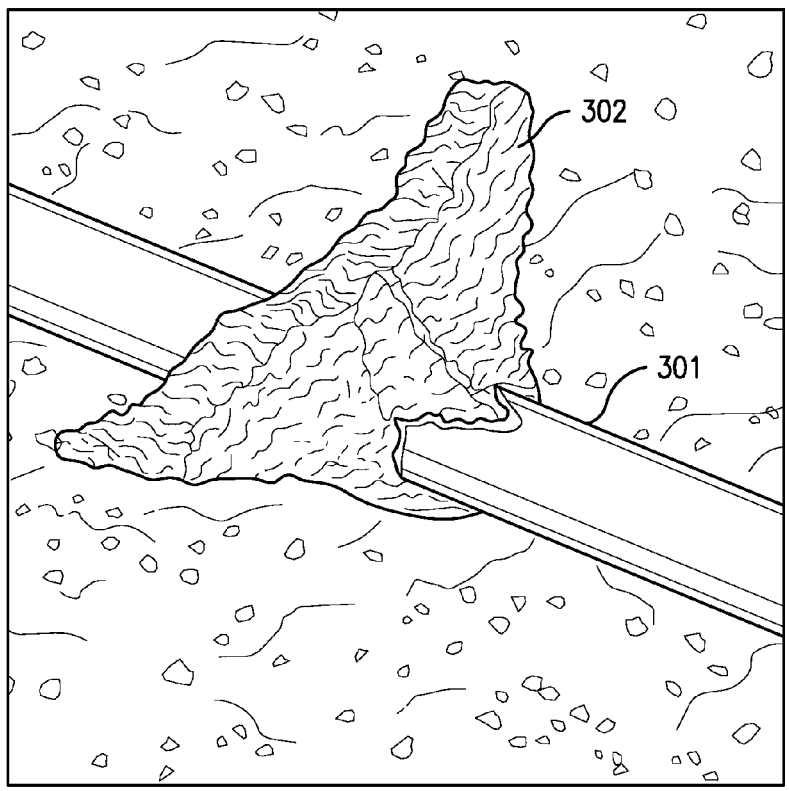
FIG. 3A is a close up drawing depicting one section of a pipe (301) surrounded by foam (302) within a trench.
Figure 3B:
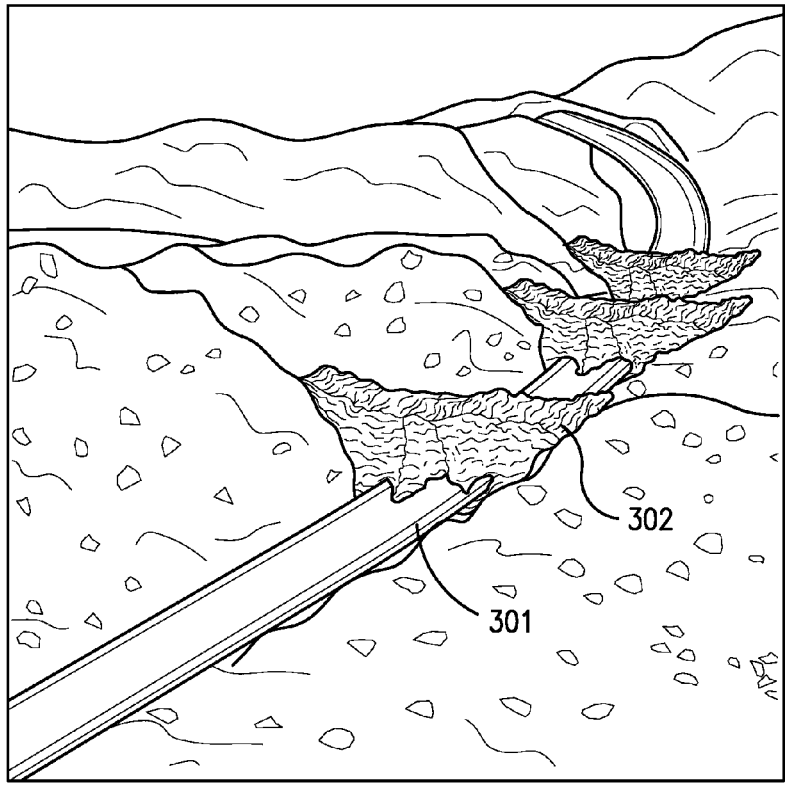
FIG. 3B is a drawing depicting a pipe (301) surrounded by foam (302) at various intervals within a trench.

A strong, yet primarily open cell foam, having a density in the range of about 1.30 lbs./ft$^3$ to 3.50 lbs./ft$^3$, and which is flotation resistant when installed as a trench breaker in a pipeline trench is provided by the present invention.

II. Practicing the Invention

When manufacturing a trench breaker polyurethane foam of the invention (wherein the foam is at least 50% open cell, has a density of approximately 1.30 lbs./ft$^3$ to 3.50 lbs./ft$^3$, has a minimum compressive strength of 17 psi parallel to the rise of the foam, and when tested in accordance with ASTM D2842 exhibits a buoyancy loss of at least 20% after 24 hours of testing under 10 feet of water, from polyurethane components A and B), component A generally contains an isocyanate, or mixtures and combinations of discrete isocyanates, and also a surfactant. The isocyanate can be any of the isocyanates, organic or inorganic, conventionally used in the production of polyurethane foams. Such polyisocyanates are commonly used in the preparation of polyurethanes by reaction with compounds containing two or more active hydrogen-containing groups. Any of the polyfunctional isocyanates, such as isophorone diisocyanate, polymeric methylenebis (phenyl isocyanate), 2,6-toluene diisocyanate, 4,4'-methylenebis(phenyl isocyanate), dianisidine diisocyanate, tolidine diisocyanate, hexamethylene diisocyanate, m-xylene diisocyanate, 1,5-napthalene diisocyanate, p-phenylene diisocyanate 1,5-napthalene diisocyanate, p-phenylene diisocyanate, 1,4-di-ethylbenzene diisocyanate, polymethylenepolyphenylisocyane, 3,3-diphenyldimethylmethane-4,4-diisocyanate, xylylene diisocyanates, xylyl diisocyanates, 2,4-toluenediisocyanate dimer, m-phenylenediisocyante, toluene diisocynates, diphenylmethane-2,4-diisocyanate, etc., can be used. Mixtures of two or more isocyanates can be used, such as mixtures of the 2,4- and 2,6-isomers of tolulene diisocyanate or 2,4'- and 4,4'-isomers of methylenebis(phenyl isocyanate). Modified forms of 4,4'-methylenebis (phenyl isocyanate) or mixtures of the 2,4'-isomer and 4,4'-isomer thereof can also be used.

A-side surfactants which can be incorporated into component A include silicones, such as B-8407, DC-5098, DC-198, Silstab 2800, L-5340 and B-8021, other silicones, and siloxaneoxyalkylene block copolymers (Bailey and O'Connor, 1958; Ferrigno, 1963).

In addition, component A can contain a blowing agent, although such an agent in component A is optional. For example, chlorofluorocarbons (CFC's), hydrochlorofluorocarbons (HCFC's), hydrofluorocarbons (HFC's), hydrfluoro ethers (HFE's), hydrofluoro olefins (HFO's), methylene chloride, hydrocarbons, alkyl alkanoates, or other organic compounds can also be used.

The materials of component A can be blended in any standard manner. The order of blending is not particularly significant. Nevertheless, a convenient order of mixing is to add surfactant to isocyanate and then to add the blowing agent(s), if any.

The relative proportions of ingredients should be such that if component A contains one or more blowing agents, the concentration of blowing agent(s) in component A is from about 0.5% by weight to about 15% by weight, preferably about 0.5% by weight to about 12% by weight, and more preferably about 2% by weight to about 10% by weight. The surfactant can make up less than about 4% by weight, preferably about 0.75% by weight, of component A. Typically, the balance of component A is the isocyanate.

Other compositions, such as fire retardants, for example, those containing bromine, chlorine or phosphorus, can also be included in component A. Because the fire retardant industry continues to be in constant flux, the available chemicals and chemical families are also in flux. However, any fire retardant that is appropriate for use in traditionally blown foams are appropriate for use in the foams of the invention.

Component B contains at least one polyol. Component B typically consists of 50% polyol(s) (by weight) to about 98% (by weight), preferably 60% (by weight) to about 92% (by weight) of at least one polyol.

When using methyl formate in component B, at least one of the polyol(s) in component B is a polyalkoxylated amine, a polyalkoxylated ether or a polyester polyol and has a hydroxyl number of from about 20 to about 1000. Preferably, the hydroxyl number is from about 20 to about 750, most preferably about 300 to about 500 for rigid foams and most preferably 20-100 flexible foams. However, the preferred hydroxyl ranges are determined solely by the desired end product. The skilled artisan can determine the appropriate hydroxyl number. The polyalkoxylated polyols preferably are polyethoxylated, polypropoxylated, or polybutoxylated, or mixtures thereof. The polyalkoxylated amine can be, for example, a polyalkoxylated aliphatic amine or a Mannich polyol; the polyalkoxylated ether can be, for example, a polyalkoxylated sucrose or glycerin; and the polyester polyol can be a transesterification of a terephthalate or castor oil. The polyols can be made individually or as coinitiators.

One or more of any one of the three classes of polyols, or any combination of polyols from any two or all three of the classes, can be used in component B. Component B can contain other polyols as well; preferably, the total of all polyols present from the three classes (that is, the total of all polyols from any of the polyalkoxylated amines, polyalkoxylated ethers and polyester polyols) make up more than about 50% by weight of all the polyols of component B, and at least about 50% by weight of component B.

Other useful polyhydric compounds, whether or not an alkyl alkanoate is used as a blowing agent and in addition to those listed above, include ethylene glycol, propylene glycol, diethylene glycol, dipropylene glycol, glycerol, pentaerythritol, sorbitol, sucrose, methyl glucoside, glucose, etc. Polyamine compounds that can be reacted with alkylene oxide to prepare amine-based polyols include mono-, di-, and triethanol amine, ethylene diamine, diethylene diamine, toluene diamine, etc. These polyhydric alcohols and polyamine compounds can be reacted separately with alkylene oxides, or they can be pre-mixed in the preparation of polyether polyol mixtures or blends. Preferred polyester polyols are those based on terephthalic, phthalic, isophthalic, adipic, succinic, glutaric, fumaric acid(s), and combinations thereof.

The polyols in the combination need not form a separate composition package to be added as a single ingredient to form component B. The ingredients of component B can be mixed in any order, and the polyols can be added separately from each other as separate ingredients to form component B.

The choice of surfactant in component B affects the cell structure and characteristics contained in the foam. Component B comprises a surfactant that promotes cell opening of the foam and results in a foam that is at least 50% open cell. Examples of cell opening surfactants include silicones and siloxane copolymers, such as Niax L-6164, DC-5160, DC-5125, DC 5241, B-8021, L-620, L-6202 (Degussa/Goldschmidt Chemical Corp.; Mapleton, Ill.); L-620 (Union Carbide; Houston, Tex.); L-6202 and Y-10390 (Air Products; Allentown, Pa.) or non-siloxane copolymers such, as Ortegol 500 or Ortegol 501 and non-silicones.

Additionally, component B may further comprise a surfactant that promotes cell closing. Examples of cell closing surfactants include silicones and siloxane copolymers, such as B8404, DC-193, DC-5598, L5440, L6900 and Silstab 2000, and non-silicones.

The concentration of cell opening surfactant in component B is from about 0.10% to about 4.0% by weight, preferably about 0.10% to about 1.0% by weight, and more preferably about 0.20% to about 0.70% by weight. If a cell closing surfactant is present, it typically makes up from about 0.10% to about 4.0% by weight, preferably about 0.50% to about 3.0% by weight, of component B. One skilled in the art can adjust the concentrations of the cell opening surfactant and the cell closing surfactant in order to obtain the desired density, compressive strength, and buoyancy of the resultant foam.

A preferred formulation showing approximate percentages by weight of the ingredients for one embodiment of the present invention is shown in Table 1.

TABLE 1

Example of a preferred formulation

|  | Constituent | % (by weight) |
|---|---|---|
| Component A | Isocyanate | 49.29 |
|  | Surfactant | 0.68 |
|  | Blowing agent | 2.63 |
| Component B | Polyalkoxylated ether | 16.90 |
|  | Polyalkoxylated ether | 11.75 |
|  | Polyalkoxylated amine | 3.56 |
|  | Flame retardant 1 | 3.56 |
|  | Flame retardant 2 | 3.56 |
|  | Surfactant | 0.63 |
|  | Cell opening surfactant | 0.19 |
|  | Catalyst 1 | 0.75 |
|  | Catalyst 2 | 0.17 |
|  | Catalyst 3 | 0.17 |
|  | Catalyst 4 | 0.53 |
|  | Acid scavenger | 0.013 |
|  | Water | 0.92 |
|  | Blowing agent | 4.74 |

In Table 1, in component A, the surfactant is Silstab 2800. In component B, the surfactant is Silstab 2000 and the cell opening surfactant is Ortegol 501.

Such a formulation of component B as presented in Table 1 results in a foam where at least 50% of the foam is open cell and the foam has a density of approximately 1.30 lbs/ft$^3$ to 3.50 lbs/ft$^3$. Those of ordinary skill in the art of producing polyurethane foams can readily adjust the types and quantities of any of the constituents in the formula such that the desired properties of the finished foam are achieved.

In those compositions in which a blowing agent can hydrolyze or otherwise deteriorate, such that a catalyst in the mixture is attacked with consequent reduction in catalytic activity, an acid may be added to the mix to protect the susceptible catalyst. Any organic acid or inorganic acid that protects the amine catalyst from acids generated by the hydrolysis of a blowing agent or other ingredients of component B can be used. Protection consists of maintaining a constancy of the reaction rate that permits the continued manufacture of the final product without a detrimental change in the performance. Any acid that functions to protect the amine catalyst from acid attack is suitable for use. In general, appropriate acids have a $pK_a$ greater than 0; more preferably 0-10; and more preferably 0-5. Preferably the acid is organic. An example of a suitable organic acid is formic acid. The acid is present in a sufficient amount to maintain the activity of any amine catalysts.

Component B can also comprise 0% to about 5%, preferably about 0.5% to about 4%, more preferably about 1% to about 3% by weight, water. Water can serve as a blowing agent as well as add rigidity to the resulting foam.

Component B can also comprise a blowing agent. Examples of blowing agents include CFC's, HFC's, HCFC's, HFE's, HFO's, aldols, hydrocarbons, alkyl alkanoates, as well as any others known to the skilled artisan. If an alkyl alkanoate is present, preferably, methyl formate is used. The blowing agent constitutes as much as about 30%, preferably about 2% to about 15% (by weight) of component B, not including water.

The alkyl alkanoate, as well as other blowing agents, can be introduced by a separate stream in addition or in place of that which can be in either or both of components A and B. The concentrations of blowing agents in components A and B and the amount introduced to the reaction mixture by way of a separate stream are adjusted and coordinated so that the resulting concentration of total blowing agents brought together upon mixing components A and B and separate streams, if any, based on the total weight of the resulting mixture, is from about 1% to about 30%, preferably from about 2% to about 15%.

Additionally, component B can contain a catalyst. The catalyst can be any of the amine catalysts conventionally used in the production of polyurethane foams. Classes of amine catalysts such as: N,N-dialklypiperazines; trialkylamines; N,N',N"-trialkylaminoalkyl-hexarihydrotriazines; mono-, di-, and tri-(dialkylaminoalkyl) monohydric phenols or thiophenols; N,N,N'N'-tetraalkylalkylenediamines; N,N-dialkylcyclohexylamines; N-alkylmorpholines; N,N-dialkylalkanolamines; and N,N,N',N'-tetraalkylguanidines, can be used. In addition to the amine catalysts, any organometallic compound known to be a catalyst in the reaction between an isocyanate group and an active hydrogen-containing group can be used as a catalyst. Such catalysts include, but are not limited to, the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

Component B can also contain other ingredients as desired. Optional additives such as dispersing agents, cell stabilizers, flame retardants, and the like, that are commonly used in the fabrication of polymer foams can be used in the process of the invention. For example, a fire retardant, such as those containing bromine, chlorine or phosphorus, can be incorporated into the mixture to impart fire resistance.

Other optional additives, such as inorganic and organic fillers, can also be used. Examples of inorganic fillers include calcium carbonate, barium sulfate, silica, glass, antimony oxides, etc.; examples of organic fillers include the various polymers and copolymers of vinyl chloride, vinyl acetate, acrylonitrile, styrene, melamine, partially oxyalkylated melamine, etc. Organic esters can also be used. Particularly preferred esters are those derived from dicarboxylic acids, such as oxalic, malonic, succinic, glutaric, maleic, phthalic, isophthalic and terephthalic acids.

Other commonly used additives are hydroxyl-containing compositions, such as castor oil, aromatic polyesters, glycols and/or alkoxylated sorbitols, acid scavengers (for example, α-methyl styrene), acid formation inhibitors or diluents.

Component A and component B can be mixed, such as through a static mix, high pressure mix or impingement mix chamber or any other device commonly known in the industry, by standard procedures to produce a homogenous blend. In a preferred embodiment, a one-shot method of foam fabrication is used, whereby the isocyanate containing stream (component A) and the polyol-containing and catalyst-containing stream (component B) are mixed. Each of these streams is preferably liquid in which all of the various additives are preferably soluble, although dispersions utilizing solid components can be used as desired.

Component A and component B are mixed in a relative proportion such that the ratio of the cyano groups of component A to the hydroxyl groups of component B, the NCO/OH ratio or index, is from about 0.8:1 to about 3:1.

The trench breaker polyurethane foam, as described herein, wherein at least 50% of the foam is open cell and the foam has a density of approximately 1.3 lbs/ft$^3$ to 3.5 lbs/ft$^3$, and has a minimum compressive strength of 17 psi parallel to the rise of the foam, and when tested in accordance with ASTM D2842 exhibits a buoyancy loss of at least 20% after 24 hours of testing under 10 feet of water, is flotation resistant and can be used to support trench pipes and prevent erosion of the trench. As such, a method of supporting trench pipes comprises inserting the trench breaker polyurethane foam into a trench in which or to which a pipe is to be or has been placed and backfilling the trench after the foam and the pipe have been inserted into the trench. The foam can be inserted directly into the trench and around the pipe. An example of directly inserting the foaming includes spraying the foam into a trench. The foam can also be formed as prefabricated saddles, which can then be inserted into the trench.

EXAMPLES

Without further elaboration, it is believed that one skilled in the art can, using the preceding description, use the present invention to its fullest extent. The following examples are offered by way of illustration and not by way of limiting the remaining disclosure.

Example 1

TABLE 2

| Foam 1 - Component B | |
|---|---|
| Constituents | % (by weight) |
| Polyether Polyol 1 | 7.52 |
| Polyether Polyol 2 | 24.78 |
| Polyether Polyol 3 | 35.66 |
| Flame Retardant 1 | 7.52 |
| Flame Retardant 2 | 7.52 |
| Surfactant | 1.33 |
| Acid Scavenger | 0.027 |
| Catalyst 1 | 1.59 |
| Catalyst 2 | 0.35 |
| Catalyst 3 | 0.35 |
| Catalyst 4 | 1.11 |
| Cell opening surfactant | 0.40 |
| Water | 1.95 |
| HFC 134a | 10.0 |

A foam that is at least 50% open cell with a density of approximately 1.3 lbs/ft$^3$ to 3.5 lbs/ft$^3$, and a minimum compressive strength of 17 psi parallel to the rise of the foam was prepared by mixing together the constituents in Table 2 to form component B of Foam 1. The surfactant used was Silstab 2000. The cell opening surfactant used was Ortegol 501. Component B was then mixed with an isocyanate, a blowing agent, and a surfactant to produce Foam 1.

Example 2

TABLE 3

| Foam 2 - Component B | |
|---|---|
| Constituents | % (by weight) |
| Polyether Polyol 1 | 6.62 |
| Polyether Polyol 2 | 22.78 |
| Polyether Polyol 3 | 33.66 |
| Flame Retardant 1 | 7.52 |
| Flame Retardant 2 | 7.52 |
| Surfactant | 1.33 |
| Acid Scavenger | 0.027 |
| Catalyst 1 | 1.59 |
| Catalyst 2 | 0.35 |
| Catalyst 3 | 0.35 |
| Catalyst 4 | 1.11 |
| Cell opening surfactant | 0.40 |
| Water | 1.85 |
| HFC 245fa | 15.0 |

A foam that is at least 50% open cell with a density of approximately 1.3 lbs/ft$^3$ to 3.5 lbs/ft$^3$, and a minimum compressive strength of 17 psi parallel to the rise of the foam was prepared by mixing together the constituents in Table 3 to form component B of Foam 2. The surfactant used was Silstab 2000. The cell opening surfactant used was Ortegol 501. Component B was then mixed with an isocyanate, a blowing agent, and a surfactant to produce Foam 2.

Example 3

TABLE 4

| Foam 3 - Component B | |
|---|---|
| Constituents | % (by weight) |
| Polyether Polyol 1 | 6.62 |
| Polyether Polyol 2 | 28.28 |
| Polyether Polyol 3 | 37.66 |
| Flame Retardant 1 | 7.52 |
| Flame Retardant 2 | 7.52 |
| Surfactant | 1.33 |
| Acid Scavenger | 0.05 |
| Catalyst 1 | 1.59 |
| Catalyst 2 | 0.35 |
| Catalyst 3 | 0.35 |
| Catalyst 4 | 1.11 |
| Cell opening surfactant | 0.40 |
| Water | 2.30 |
| Methyl formate | 2.0 |

A foam that is at least 50% open cell with a density of approximately 1.3 lbs/ft$^3$ to 3.5 lbs/ft$^3$, and a minimum compressive strength of 17 psi parallel to the rise of the foam was prepared by mixing together the constituents in Table 4 to form component B of Foam 3. The surfactant used was Silstab 2000. The cell opening surfactant used was Ortegol 501. Component B was then mixed with an isocyanate, a blowing agent, and a surfactant to produce Foam 3.

Example 4

In accordance with ASTM D-6226, open cell content of a foam, prepared as provided in the Example 1, was determined by using an air pycnometer. Results are shown in Table 5

TABLE 5

% Open Cell

| | Sample 1 | Sample 2 |
|---|---|---|
| Length (mm) | 50.66 | 51.62 |
| Height (mm) | 27.26 | 27.08 |
| Width (mm) | 27.95 | 27.25 |
| Volume (cm$^3$) | 38.60 | 38.09 |
| P1 (psi) | 2.338 | 2.326 |
| P2 (psi) | 1.475 | 1.471 |
| P3 (psi) | 2.341 | 2.357 |
| P4 (psi) | 1.480 | 1.497 |
| % Open Cell Absolute | 90.41 | 92.92 |
| % Open Cell Adjusted | 88.15 | 88.2 |

Example 5

Samples from Foam 1, made as provided in Example 1, were prepared according to ASTM D-1622. Results are as shown in Table 6.

TABLE 6

Density

| | Sample 1 |
|---|---|
| Length (in) | 2.370 |
| Height (in) | 2.649 |
| Width (in) | 2.404 |
| Weight (g) | 11.09 |
| Density (lb/ft$^3$) | 2.80 |

Example 6

In order to determine the percentage (%) change in buoyancy, samples from Foam 1, made as provided in Example 1, were immersed under a 10 foot column of water and then prepared in accordance with ASTM D-2842.

At the end of the 24 hours, a balance platform and balance was assembled on top of the tank and the balance was zeroed. An underwater weighing jig was attached to the balance with wire sling such that the top horizontal surface of the jig was 5.1 cm below the surface of the water. The empty submerged jig was weighed to the nearest 0.1 g ($W_1$). A test specimen was inserted into the submerged underwater weighing jig. The underwater weighing jig with the specimen was weighed ($W_2$). After 24 hours the underwater weighing jig with the specimen was weighed again ($W_3$).

In order to determine the percentage (%) change in buoyancy, the initial buoyancy of the samples and the final buoyancy of the samples were measured. The initial buoyancy, final buoyancy, and percentage change in buoyancy were calculated as follows:

$$\text{initial buoyancy} = W_2 - W_1$$

$$\text{final buoyancy} = W_3 - W_1$$

$$\% \text{ change} = \frac{(\text{final buoyancy} - \text{initial buoyancy})}{\text{initial buoyancy}} \times 100$$

Results are as shown in Table 7.

TABLE 7

| Sample | $W_1$ | $W_2$ | $W_3$ | Initial Buoyancy | Final Buoyancy | % Change |
|---|---|---|---|---|---|---|
| 1 | 2143 | 429 | 1019 | 1714 | 1124 | 34.42 |
| 2 | 2143 | 433 | 980 | 1710 | 1163 | 31.99 |
| 3 | 2143 | 432 | 941 | 1711 | 1202 | 29.75 |

Other Embodiments

The detailed description set forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

REFERENCES

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

What is claimed is:

1. A method of supporting trench pipes comprising:
   inserting a pipe into a trench;
   inserting a composition comprising a polyurethane foam into the trench; and
   backfilling the trench so as to cover at least a portion of the pipe and the polyurethane foam;
   wherein,
      the foam contacts at least a portion of the pipe in the trench; and
      the composition comprising the polyurethane foam comprises
      (i) at least 50% open cell;
      (ii) a density of approximately 1.3 lbs/ft$^3$ to 3.5 lbs/ft$^3$;
      (iii) a minimum compressive strength of 17 psi parallel to a rise of the foam; and
      (iv) a buoyancy loss of at least 20% after 24 hours of testing under 10 feet of water.

2. The method of claim 1, wherein the pipe is inserted into the trench before the polyurethane foam is inserted into the trench.

3. The method of claim 1, wherein the polyurethane foam is inserted into the trench before the pipe is inserted into the trench.

4. The method of claim 1, wherein the polyurethane foam and the pipe are simultaneously inserted into the trench.

5. The method of claim 1, wherein backfilling the trench substantially covers the pipe and the polyurethane foam.

6. The method of claim 1 wherein the open cell content of the foam is measured using an air pycnometer.

7. The method of claim 1 wherein the buoyancy loss of the foam is determined by:

(i) submerging a jig into a column of water;
(ii) determining the weight measured by the jig ($W_1$);
(iii) inserting and weighing a test specimen into the jig ($W_2$); and
(iv) weighing the test specimen after 24 hours ($W_3$); wherein the test specimen is immersed under a 10 foot column of water; and the percent change in buoyancy is determined by the equations:

$$\text{initial buoyancy} = W_2 - W_1; \quad (1)$$

$$\text{final buoyancy} = W_3 - W_1; \text{ and} \quad (2)$$

$$\% \text{ change} = (\text{final buoyancy} - \text{initial buoyancy})/(\text{initial buoyancy}) \times 100. \quad (3)$$

\* \* \* \* \*